(12) United States Patent
Kawakatsu et al.

(10) Patent No.: US 6,247,631 B1
(45) Date of Patent: Jun. 19, 2001

(54) ELECTRIC SOLDERING IRON

(75) Inventors: Ichiro Kawakatsu, Tokyo; Takashi Uetani, Osaka, both of (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 09/480,228

(22) Filed: Jan. 10, 2000

(30) Foreign Application Priority Data

Jan. 18, 1999 (JP) .................................. 11-009667

(51) Int. Cl.[7] ................. B23K 3/02; B23K 3/03; B23K 1/012; B23K 9/16; H05B 1/00
(52) U.S. Cl. .................. 228/51; 228/53; 219/229; 219/74
(58) Field of Search ................. 228/51, 53, 25; 219/228, 229, 240, 476, 530, 535, 616, 74; 126/236, 237

(56) References Cited

U.S. PATENT DOCUMENTS

| | | | |
|---|---|---|---|
| 2,751,484 | * | 6/1956 | Moon . |
| 2,962,053 | * | 10/1960 | Epstein . |
| 3,467,143 | * | 9/1969 | Croft . |
| 3,786,229 | * | 1/1974 | Hombrecher . |
| 3,792,816 | * | 2/1974 | Evans . |
| 3,882,382 | * | 5/1975 | Johnson . |
| 4,419,566 | * | 12/1983 | Fortune . |
| 4,607,665 | * | 8/1986 | Williams . |
| 4,674,772 | * | 6/1987 | Lycan . |
| 4,926,028 | * | 5/1990 | Fortune . |
| 5,054,106 | * | 10/1991 | Fortune . |
| 5,059,769 | * | 10/1991 | Fortune . |
| 5,100,047 | * | 3/1992 | Nakagawa et al. . |
| 5,127,441 | * | 7/1992 | Rains . |
| 5,186,502 | * | 2/1993 | Martin . |
| 5,483,040 | * | 1/1996 | Fortune . |
| 5,683,603 | * | 11/1997 | Fortune . |
| 5,743,299 | * | 4/1998 | Chick et al. . |
| 5,799,395 | * | 9/1998 | Nording et al. . |

* cited by examiner

*Primary Examiner*—Patrick Ryan
*Assistant Examiner*—Colleen P. Cooke
(74) *Attorney, Agent, or Firm*—Squire, Sanders, & Dempsey LLP.; David B. Abel; Dave B. Koo

(57) ABSTRACT

A soldering iron device has a gas passage formed by enclosing a soldering iron tip 3 of an electric soldering iron with double pipes 6 and 7 to make a nozzle. By providing projections A, B and C in the spacing between said double pipes, the double pipes are prevented from any eccentricity and biasing, and the velocity of an inert gas G to be supplied is made slow to ensure that the gas is jet through the nozzle tip end. Further, engulfing of oxygen in the atmospheric air can be suppressed, whereby it is possible to prevent defective wetting of solder due to high temperature oxidation of the soldering iron tip and to suppress high temperature oxidation of workpieces and flux cored solder alloy and flux, and excellent solderability is obtained.

17 Claims, 5 Drawing Sheets

FIG. 4
(a)
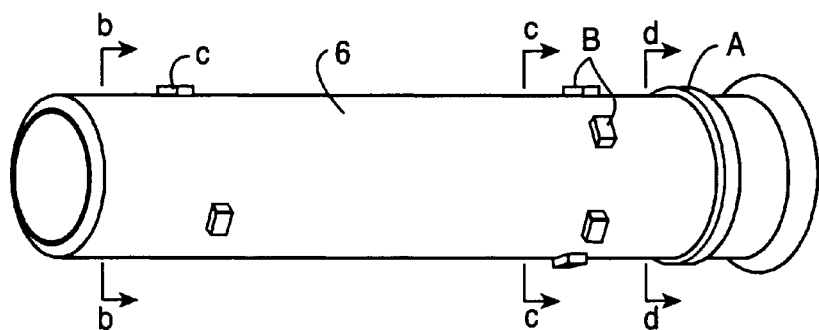
(b) 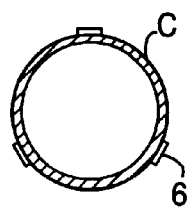 (c) 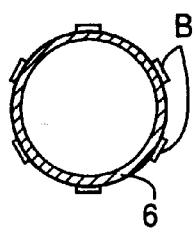 (d) 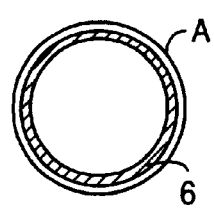
(e)
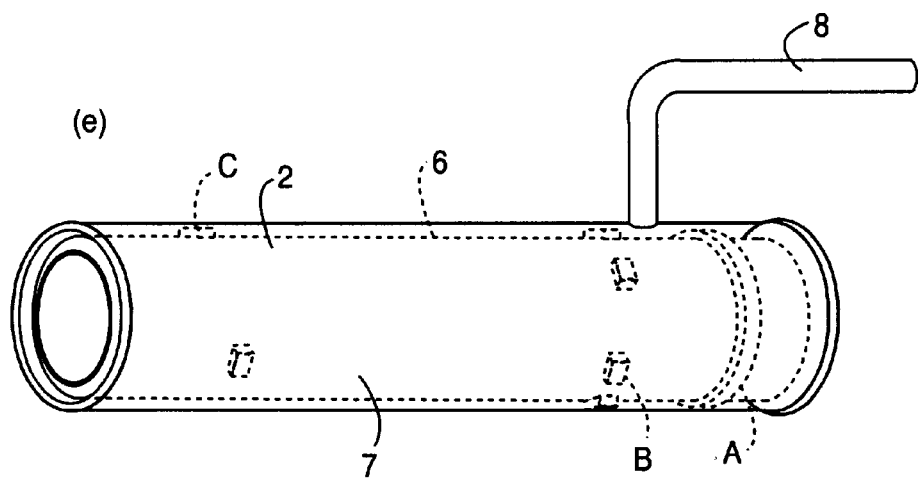

ELECTRIC SOLDERING IRON

BACKGROUND OF THE INVENTION

1. Field of the Invention

The present invention relates to a soldering iron having a nozzle, which provides an inert gas passage, fixed in the vicinity of the tip of an electric soldering iron, and protecting the iron tip from oxidation due to high temperature, and protecting both a member to be soldered, and solder made of a flux cored solder alloy and flux from oxidation, by jetting an inert gas from the nozzle.

2. Description of the Related Arts

It is common practice that connecting and bonding are carried out by soldering in industries, especially electronic industries. The reasons are that an Sn—Pb alloy used for soldering has a low melting point, and its workability is high, and further portions thus connected or bonded have a high reliability.

The soldering method is largely classified into a mass soldering method (collective soldering method) and a manual soldering method.

The mass soldering method is further classified into a flow soldering method in which a printed circuit board (PCB) incorporating IC elements, components, etc. is soldered by being immersed into molten solder, and a reflow soldering method (SMT) in which heated soldering is carried out after solder paste obtained by blending solder grains and flux together with a binder material is printed to a soldering portion on a printed circuit board(PCB), wherein either of them has a feature in that a number of points are soldered almost at the same time.

On the other hand, the manual soldering method is mainly carried out by using a soldering iron. In this case, although it is impossible to solder a number of points at the same time, this method has been employed since a long time ago, and there is an advantage in that anyone is easily able to perform soldering. The manual soldering by using a soldering iron is still required for correcting or retouching defects produced by the mass soldering method.

Hereinafter, the present invention relates to an electric soldering iron.

In addition, FIG. 1 and FIG. 2 show an electric soldering iron according to the prior art, wherein FIG. 1 shows disassembled parts of a soldering iron, and FIG. 2 shows an assembled iron.

As shown in these drawings, a prior art soldering iron is such that, after a cap nut 1 is attached to a protection pipe 2, a hollow iron tip 3 is attached to a ceramic heater 4 and is further attached to a nipple 5, and they are tightened and fixed with the cap nut 1. And, heat coming from the ceramic heater incorporated in the iron tip portion is transmitted to a copper iron tip 3, whereby the iron tip is heated.

As a general method of using an electric soldering iron, there is a soldering method in which an Sn—Pb based alloy called flux cored solder is melted on an iron tip, the melted solder on the iron tip is brought to a soldering position, such as a component of a workpiece, and another method in which a workpiece is preheated by using an iron tip and flux cored solder is supplied to the workpiece after it is sufficiently heated. In either case, in view of the working efficiency, it is desirable that the iron tip temperature is approximately 150° C. above the melting point of a solder alloy to be used. For example, since the melting point of conventional Sn-37% Pb eutectic solder is 183° C., the temperature of the iron tip is set from 330 through 350° C. in order to carry out the work, wherein soldering carried out within the temperature range above has no problem.

However, in recent years, Pb which is a main constituent of Sn—Pb solder has been regarded as one of the greatest causes of water pollution and no longer seems to be used in solder alloys. Waste products such as those of domestic electrical appliances and automobiles are illegally dumped, and Pb flows out from printed circuit boards in the internal components, by external causes such as acid rain, etc., and contaminates underground water by permeating soil. This has been considered as a large social problem in the United States of America, and a Pb-free environment is highly desired worldwide.

Various types of Pb free solder have been developed until now. However, since pure Sn, Sn-3.5% Ag, Sn—Bi—Ag, etc., are based on Sn-based alloys, the range of the melting point is from 210 to 232° C. and is higher by 30 to 50° C. than that of conventional Sn-37% Pb solder. Therefore, the operating temperature becomes higher, wherein unless the iron tip temperature is raised above 350° C., sufficient soldering performance cannot be obtained.

However, the operating environment where a soldering iron tip with a temperature exceeding 350° C. is used becomes considerably different from that where a conventional soldering iron tip has been used. In such temperature range, flux is deteriorated and oxidation of a soldering iron tip occurs if it is made of pure copper or copper alloys. Therefore, if Pb-free solder is used, the soldering performance may be remarkably reduced. This is an adverse influence caused by ambient oxygen. It is therefore an object of the present invention to solve such problems by installing a nozzle which jets an inert gas to a soldering iron tip.

SUMMARY OF THE INVENTION

In order to achieve the above object, an electric soldering iron according to the present invention comprises an inner pipe externally attached to the base end of the soldering iron tip and an outer pipe externally attached to the inner pipe with spacing secured therebetween, and has a nozzle which jets an inert gas, which is supplied from the base end portion of the soldering iron tip, to the tip end side of the iron tip through the spacing between these two pipes, wherein a plurality of projections which dispose the outer pipe concentrically with the inner pipe are provided on the outer circumferential surface of the inner pipe and the inner circumferential surface of the outer pipe.

Specifically, for example, an electric soldering iron according to the invention is such that the projections are formed to protrude outward in the diametrical direction on the outer circumferential surface of the inner pipe, and the projections are provided with projections A formed at the base end side of the inner pipe, projections C formed at the tip end side of the inner pipe and projections B formed between the projections A and projections C, wherein the outer diameters at portions where these projections are formed are sized so as to be suitable for the inner diameters of the outer pipe, the projections A are formed to be annular so as to continue in the circumferential direction, an inert gas is supplied from the pipe brazed on the surface of the outer pipe between the projections A and projections B, and the projections C are disposed so that the interval thereof in the circumferential direction is wider than that of the projections B.

Also, preferably, in addition to either of the above constructions, a stainless steel wire net or metallic wool is disposed in the spacing formed between the inner pipe and the outer pipe.

Moreover, in addition to either of the above constructions, an open port at the nozzle tip end is tapered toward the tip end portion of the soldering iron.

Furthermore, in addition to either of the above constructions, the outside of the tip end portion of the soldering iron tip may be enclosed by lengthening the outer pipe to such an extent that the working is not adversely influenced. That is, the tip end portion of the iron tip exposed to the atmosphere may be enclosed by lengthening the outer pipe to such an extent that the working is not adversely influenced.

With the invention, an inert gas passage is freed from any eccentricity or bias of the above two pipes, whereby an inert gas can be uniformly jetted through the surrounding of a jetting portion of an open port. Further, simultaneously, a damping effect of a high speed gas from an inert gas inlet can be obtained while the gas passes through a stainless steel wire net in the gas passage, whereby the jetting of an inert gas from the open port at the tip end can be damped, thereby preventing oxygen from being engulfed from the ambient atmosphere.

Therefore, it is possible to remarkably prevent a copper tip attached to the soldering iron from oxidation due to high temperature, whereby it is possible to prevent solder from defective wetting. In addition, oxidation of a workpiece brought into contact with and heated by the iron tip, and high temperature oxidation of solder and flux of a flux cored solder alloy can be inhibited by an inert gas jetting to the workpiece, and as a result the soldering performance can be remarkably improved to obtain soldered joints with high reliability

BRIEF DESCRIPTION OF THE DRAWINGS

FIG. 4 show components of one preferred embodiment of an electric soldering iron according to the present invention, wherein (a) is a perspective view of an inner pipe to show the internal structure of a gas passage (spacing), (b) through (d) are sectional views, each showing portions (A) through (C) of the inner pipe to show a structure of projections, and (e) is a perspective view showing an assembled state of the inner pipe in an outer pipe.

DETAILED DESCRIPTION OF THE PREFERRED EMBODIMENTS

Hereinafter, a further detailed description is given of a preferred embodiment of an electric soldering iron according to the invention.

Figure 1:
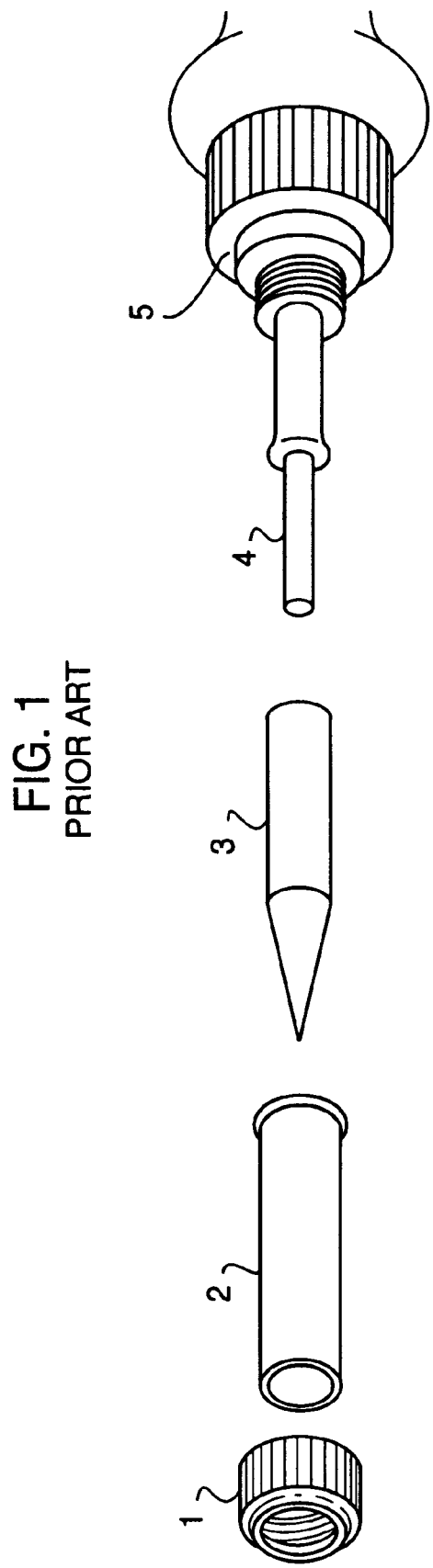
FIG. 1 is a perspective view showing the components of a prior art electric soldering iron prior to being assembled.
Figure 2:
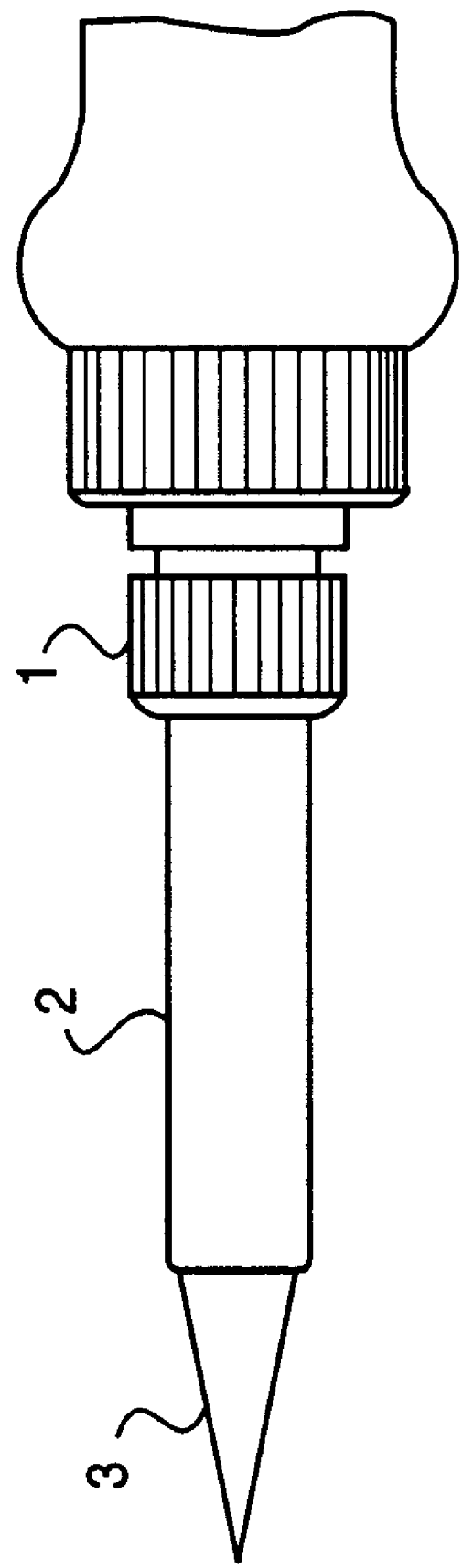
FIG. 2 is a perspective view showing an assembled state of an electric soldering iron illustrated in FIG. 1.
Figure 3:
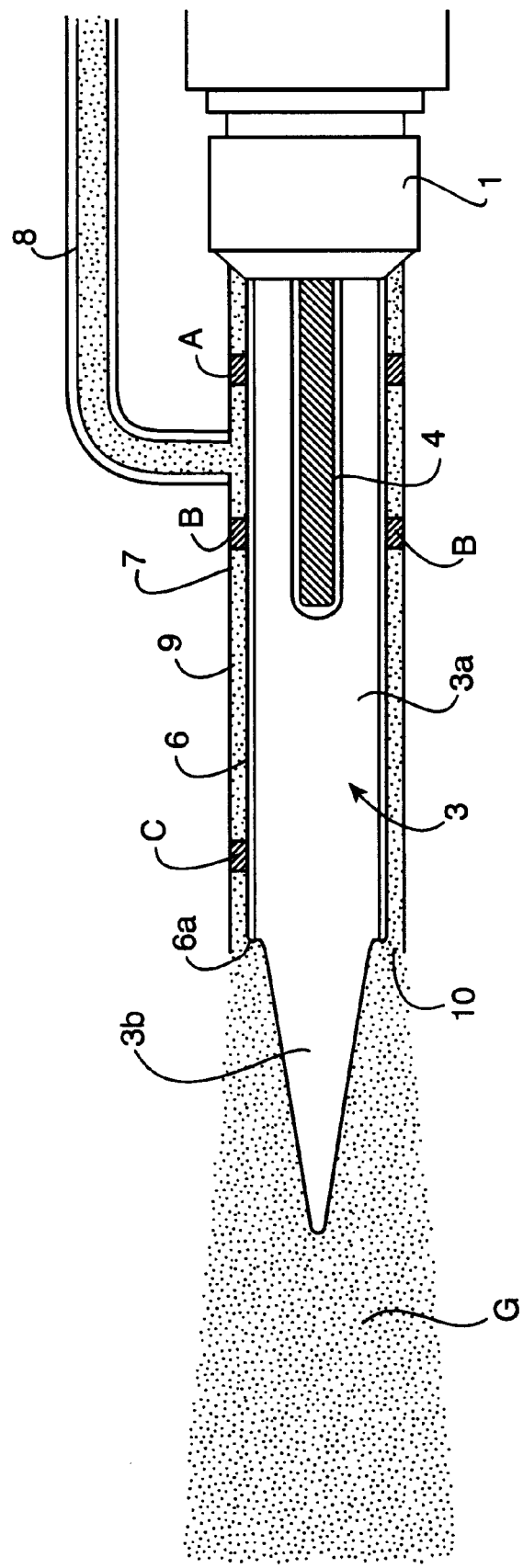
FIG. 3 is a sectional view showing an electric soldering iron as an example of the embodiment of the present invention.

FIG. 3 is a sectional view showing a general structure of the preferred embodiment of an electric soldering iron in which the invention is embodied, and the drawing shows only the iron tip portion.

A soldering iron according to the preferred embodiment is of a type in which the iron tip 3 is heated by a heating source from a heater 4 incorporated in the iron tip portion. That is, the iron tip 3 is formed so that its tip end side 3b is formed to be roughly conical, that is, tapered toward the tip end side while its base end side 3a is formed to be rod-like, wherein a ceramic heater 4 is inserted from the base end of the rod-like base end portion 3a.

An inner pipe 6 is externally fitted to the rod-like base end portion 3a of the iron tip 3. The base end portion of the inner pipe 6 is attached to a nipple at the grip of the soldering iron by a cap nut 1. Also, the tip end portion 6a of the inner pipe 6 is formed to be slightly tapered, and the tip end portion 6a holds the tip end portion of the rod-like base end portion 3a of the iron tip 3.

Spacing which becomes a gas passage 9 is provided on the inner pipe 6, and an outer pipe 7 is externally fitted thereto. The outer pipe 7 is formed to be the same as the tip end portion of the inner pipe 6 or so as to be slightly further extended toward the tip end than the inner pipe 6. That is, in the example illustrated in FIG. 3, the outer pipe 7 extends toward the tip end portion (the base end of a conical portion 3b) of the rod-like base end portion 3a of the iron tip 3 and is disposed there.

A pipe 8 for an inert gas G is provided at a part of the outer circumferential surface of the outer pipe 7, the inert gas G from the feeding port is supplied to the inside of the outer pipe 7, and the inert gas G is jetted through an outlet(jetting port) 10 at the tip end of a roughly annular gas passage 9, which is formed between the inner pipe 6 and the outer pipe 7, via the gas passage 9.

Accordingly, in the present invention, a plurality of projections A, B and C are disposed between the inner pipe 6 and the outer pipe 7, wherein the outer pipe 7 is supported by these projections A, B and C to dispose the outer pipe 7 concentrically with the inner pipe 6. That is, spacing 9 between the inner pipe 6 and the outer pipe 7 is made annularly uniform over the entire circumference of the pipe. Therefore, eccentricity or biasing of both pipes 6 and 7 can be prevented through the above structure, and an inert gas G can be uniformly jetted from the outlet 10. The projections A, B and C are provided to prevent uneven jetting caused by the eccentricity or biasing of both pipes 6 and 7 which produces an imbalance of the atmospheric air (especially, oxygen concentration) of the inert gas G.

Although the projections A, B and C may be formed on the inner circumference of the outer pipe 7 so that they protrude inward in the radial direction, in the preferred embodiment, the projections A, B and C are formed on the outer circumference of the inner pipe 6 so as to protrude outward in the radial direction as shown in FIGS. 4.

In FIGS. 4, (a) is a perspective view showing one example of the inner pipe 6, (b) to(d) are sectional views showing the projections A, B and C of the inner pipe 6 illustrated in (a), wherein (b) is a sectional view taken along the line b—b, (c) is a sectional view along the line c—c, and (d) is a sectional view along the line d—d, and (e) is a perspective view showing a state where the outer pipe 7 with the pipe 8 is attached to the inner pipe 6.

As shown in FIG. 4(a) as a preferred embodiment, projections are provided at three points A, B, and C in the axial direction on the circumference of the inner pipe 6. That is, in the example illustrated, projections A are formed at the base end side of the inner pipe 6, projections C are formed at the tip end side of the inner pipe 6, and projections B are formed between the projections A and projections C. In addition, in the example illustrated, the projections B are positioned slightly nearer to the base end than the middle point between the projections A and projections C. Further, the projections A, B and C in the illustrated example are disposed like bands along the circumferential direction of the inner pipe 6.

The outer diameter (the outer diameter defined by the tip end portion of the projections) of the portion where the projections A, B and C are formed is suitable for the inner diameter of the outer pipe 7. That is, the height of the projections is determined so that the inner pipe 6 can be inserted and mounted in the outer pipe 7 without any clearance. In addition, in the illustrated example, the tip end portions (the end faces outside in the radial direction) of the projections A, B and C are formed to be arcuate along the inner circumference of the outer pipe 7.

The projections A are provided to keep the base end portion airtight, which is positioned opposite the tip end outlet of a nozzle between the pipes 6 and 7. That is, the projections A are formed continuously annular on the circumference of the inner pipe 6.

Three projections C are equidistantly formed on the circumference in the illustrated example. That is, three projections C of the same shape are positioned at an interval of 120 degrees, wherein the outer pipe 7 is retained on the outer circumference of the inner pipe 6 with spacing 9 by a three-point supporting system. Accordingly, as described above, since the outer diameters of the projections A and C are formed to have a size suitable for the inner diameter of the outer pipe 7, the outer pipe 7 can be disposed concentrically with the inner pipe 6 without any eccentricity or biasing. That is, the thickness of a gas passage 9 formed between the pipes 6 and 7 can be kept uniform.

On the other hand, the projections B illustrated are protruded and formed more closely and precisely on the circumference than the projections C, wherein projections and dents are formed like gear teeth. In the illustrated examples, six projections of the same shape are equidistantly formed on the circumference, that is, disposed at every 60 degrees.

Further, an inert gas pipe 8 is connected to the outer pipe 7 between the projections A and B. Therefore, the projections B take a role of uniform supply of a gas G coming in from the inert gas pipe 8 into the tip end of the gas passage 9 through a gas outlet at a recess between the projections B. And, the inert gas G passing through the projections B further passes through a recess between the projections C and is jetted through a jetting port 10. Further, the eccentricity and biasing of the gas passage 9 can be prevented by providing the projections A, B and C, whereby it becomes possible for the inert gas G to be uniformly jetted.

However, since a high speed gas G is supplied into a narrow gas passage 9, the jetting through the tip end outlet 10 increases and engulfs oxygen in the ambient atmosphere, whereby there is a fear that the oxygen concentration at the tip end of a soldering iron is increased to deteriorate the atmospheric air. Therefore, in the invention, it is preferable that a damping member 11 is provided in the gas passage 9 between B and C of the inner pipe 6 as shown in FIG. 5.

Figure 5:
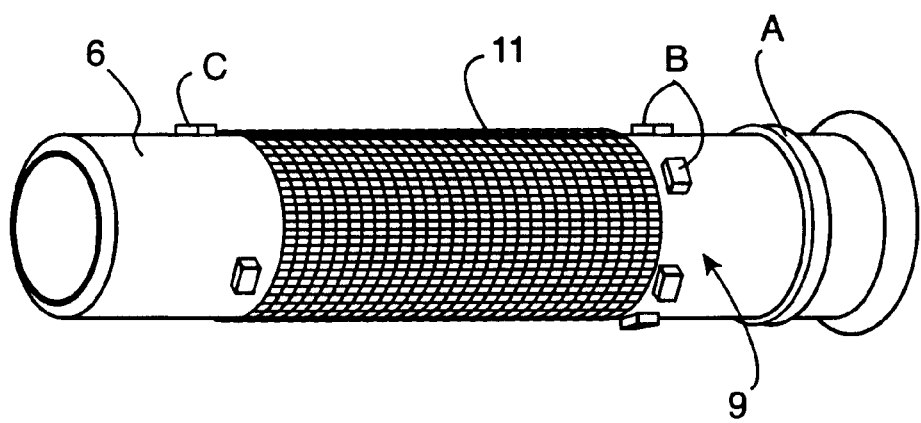
FIG. 5 is a perspective view showing a state where a stainless steel wire net is wrapped on the outer circumference of the inner pipe shown in FIG. 4(a).

As a damping member 11, as shown in FIG. 5, a stainless steel wire net 11 may be annularly wrapped on the outer circumference of the inner pipe 6 or metallic wool may be disposed there.

By providing the damping member 11, a high speed inert gas G supplied from the projection B side into the tip end side can be decelerated to produce a slow flow of the inert gas G jetted through the outlet 10. As a result, oxygen engulfed from the atmosphere is inhibited, and the ambient air near the tip end of the soldering iron can be kept in good condition.

In addition, the state of jetting gas G may be improved by changing the shape of the nozzle tip end instead of, or in addition to the damping member 11.

Figure 6:
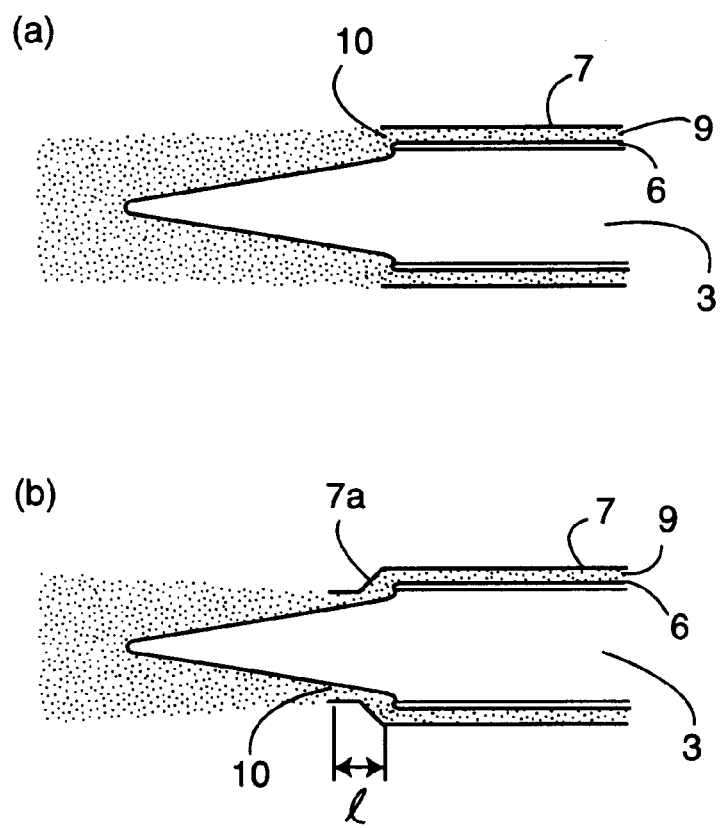
FIGS. 6 are roughly sectional views showing an iron tip of an electric soldering iron in which the present invention is embodied, wherein (a) shows the tip end of a straightly elongated nozzle, and (b) is a nozzle tip tapered toward the tip end.

FIG. 6 is a conceptual sectional view showing the soldering iron tip of the preferred embodiment, which shows a basic shape of the nozzle. In the same drawing, (a) shows a shape in which the outer pipe 7 is straightly lengthened along the inner pipe 6, and (b) shows a state where the outer pipe 7 is slightly elongated from the tip end portion of the inner pipe 6 to the tip end side, the elongated portion 7a of the outer pipe 7 is finely drawn along the conical portion 3b of the soldering iron tip portion 3, and the diameter of the outlet 10 is tapered.

FIG. 6(a) shows the enlarged area where the inert gas G acts effectively.

On the other hand, the shape shown in FIG. 6(b) has an effect of concentrating the inert gas G on the center portion, wherein the amount of use of the inert gas G can be decreased while the area of operation becomes slightly small, but satisfactory atmosphere can be obtained.

In addition, although the distance from the outlet 10 to the tip end of the soldering iron tip 3 is greatly influenced by the atmospheric air, the shorter the soldering iron tip, the more effective. However, if the distance from the outlet 10 to the tip end of the iron tip 3 is shortened, the workability is easily restricted, the outer pipe 7 is lengthened to such an extent that the working is not adversely influenced, and it is preferable that the surrounding is enclosed.

Further, in the invention, since an inert gas G is supplied into spacing between the inner pipe 6 and the outer pipe 7 and is jetted by the tip end portion of the soldering iron tip, a cold inert gas G is not directly brought into contact with the soldering iron tip 3, thereby inhibiting a lowering of temperature. Therefore, no problem arises while it is operated. In addition, since an inert gas G jetted from a nozzle becomes a high temperature gas of 100 to 150° C., this contributes to preheating of workpieces.

Next, a description is given of influences which the existence of a damping member (stainless steel wire net) 11 and the position of the outlet 10 have on engulfing of oxygen into the inert gas G (nitrogen gas) jetted to the soldering iron tip end.

First, using a nozzle shown in FIG. 4(e), the amount of oxygen in nitrogen gas was investigated.

That is, such a nozzle was used, which consists of an inner pipe 6 having the total length of 45 mm, an outer diameter of 8 mm, and an inner diameter of 7 mm, and an outer pipe 7 having a total length of 40 mm, outer diameter of 10 mm and inner diameter of 9 mm. The inner structure of the nozzle is such that a projection A for keeping an airtight state is constructed by wrapping a ring 3 mm wide and 0.5 mm thick at the opposite side of the outlet 10 on the inner ring 6, and the projections C at the outlet 10 are comprised of three projections 0.5 mm thick, whereby a gas passage 9 free from any eccentricity was constructed. In addition, in the preferred embodiment, the clearance of the gas passage 9 is 0.5 mm.

Further, teeth-like gear projections and dents, which form a gas passing port, were provided at the tip end from the gas pipe 8 of the outer pipe 7, thereby forming projections B, whereby an inert gas was supplied to the tip end side through the dents between the projections B. In this case, the pitch between the projections and dents of the passing port was 2 mm. In addition, in the preferred embodiment, nitrogen gas was used as an inert gas G.

Then, a nitrogen gas G was supplied from the gas pipe 8, using the above-mentioned nozzle, and the oxygen concentration of the nitrogen gas G jetted to the soldering iron tip end was measured. The measuring method was such that the entire soldering iron was inclined by approximately 45 degrees to the workpiece, the soldering iron tip end 3 was brought into contact with the workpiece, an oxygen concentration measuring device (not illustrated) consisting of a gas sensor and an oxygen meter was brought into contact with the tip end of the soldering iron tip 3, and the flow rate of nitrogen gas G and the atmospheric air (oxygen concentration) of the jet were investigated. The results are shown in Table 1.

TABLE 1

| Nitrogen gas flow rate (L/min.) | Measured oxygen amount (%) |
|---|---|
| In the atmosphere | 20.9 |
| 0.5 | 5 to 8 |
| 1.0 | 2 to 3.5 |
| 1.5 | 1 to 1.5 |
| 2.0 | 0.8 to 2.2 |
| 3.0 | 0.8 to 2.8 |

From Table 1 above, basically, it was found that the oxygen concentration is decreased in line with an increase in the flow rate of nitrogen gas and the oxygen concentration is decreased to approx. 1% at a rate of 1.5 L/min. However, no remarkable effect occurs even though the flow rate is further increased than in the above. On the contrary, there is a tendency that the amount of oxygen is increased or an imbalance arises in the oxygen volume. It is considered that the jetted nitrogen gas G engulfs oxygen in the ambient atmospheric air in line with an increase in the flow rate.

Next, the oxygen amount in nitrogen gas was investigated, using a nozzle illustrated in FIG. 5.

That is, as shown in FIG. 5, a stainless steel wire net 10, of which the outer diameter of a string is 0.05 mm, (400 meshes) was annularly wrapped on the inner pipe 6 between B and C of the gas passage 9 in order to suppress the velocity of nitrogen gas G in the nozzle shown in FIG. 4(e), and the assembly was inserted into the outer pipe 7. After that, the nitrogen gas velocity and oxygen concentration were measured by a method similar to that in Table 1 above. Table 2 below shows the results.

TABLE 2

| Nitrogen gas flow rate (L/min.) | Measured oxygen amount (%) |
|---|---|
| In the atmosphere | 20.9 |
| 0.5 | 2.8 |
| 1.0 | 1.5 |
| 1.5 | 1.0 |
| 2.0 | 0.7 |
| 3.0 | 0.5 |

From Table 2, the oxygen concentration in the vicinity of the soldering iron tip which is in contact with a workpiece becomes 1.0% as the nitrogen gas flow rate becomes 1.5 L/min. or more, and the atmospheric air enters a reduced oxygen state such as 0.5% at a rate of 3 L/min. It was found that the imbalance is slight, in comparison with the example 1 above. This is because, since a stainless steel wire net 11 wrapped between B and C of the gas passage 9 operates as a damper to dampen the velocity, and engulfing and mixture of oxygen existing in the atmosphere can be suppressed by slowly sending out the jetting gas G.

Further, the iron tip is brought into contact with a pure copper plate whose size is 30×20×0.3 mm thick while heating the pure copper plate at a temperature of 270° C., and nitrogen gas whose rate is 0.5 through 3 L/min. is jetted onto the contacted section. As a result, an oxygen-free copper surface whose area is 1 through 3 $cm^2$ can be obtained. Clearly, an effect of nitrogen gas jetting can be obtained. And, it was found that the solderability was improved.

In addition, in actuality, using a flux cored solder of Sn-3.7% Ag, an element was soldered on a printed circuit board. As a result, since a nitrogen gas is jetted through a gas passage 9 in a high temperature environment, the temperature of the jetting gas becomes 100 through 150° C., which functions as a preheating effect, whereby it was found that the solderability was remarkably improved.

Finally, using a nozzle shown in FIG. 6(b), the amount of oxygen in a nitrogen gas was investigated. As described above, this is because it is considered that the nozzle shape at the outlet greatly influences the oxygen concentration at the tip end of the soldering iron tip.

In addition, in the tests to obtain the above Tables 1 and 2, a nozzle having the shape as shown in FIG. 6(a) was used. That is, the outlet of the gas jetting port 10 is formed by the outer pipe 7 straightly extending along the inner pipe 6.

On the other hand, in FIG. 6(b), the outer pipe 7 is constructed so that it is thinly drawn inward of the soldering iron tip 3 from the tip end portion of the inner pipe 6.

Such a nozzle was used here in which the tip end of the outer pipe having an outer diameter of 10 mm and an inner diameter of 9 mm is drawn so that the outer diameter becomes 7 mm dia., the inner diameter becomes 6 mm dia., and the overhang length 1 becomes 3 mm. The nitrogen gas flow rate and oxygen amount were measured. The results thereof are shown in Table 3 below.

TABLE 3

| Nitrogen gas flow rate (L/min.) | Measured oxygen amount (%) |
|---|---|
| In the atmosphere | 20.9 |
| 0.5 | 2.4 |
| 1.0 | 1.1 |
| 1.5 | 0.8 |
| 2.0 | 0.5 |
| 3.0 | ≦0.4 |

On the basis of Table 3 above, it was found that, by making the tip end of a nozzle tapered, a low oxygen concentration could be obtained with a further smaller amount of nitrogen gas G than in the case of FIG. 5 above.

Further, the solderability of an iron tip was examined in a state where, using an Sn-3.5% Ag Pb-free flux cored solder, the temperature of the soldering iron tip was raised to 400° C. As a result, since the soldering iron tip temperature is high in the atmospheric air, the copper tip end of the soldering iron tip 3 was quickly oxidized and contaminated by carbonization, etc., of adhered flux, wherein defective wetting of the solder arose. However, where a nitrogen gas was jetted in a range of 1 to 3 L/min., the oxidation of the soldering iron tip was inhibited, and the iron tip was deteriorated less by carbonization of adhered flux, and no defective wetting arose in a longer period of time.

Also, a soldering iron according to the present invention is not limited to the above embodiments, but it may be subjected to various modifications.

In the above preferred embodiments, an example is given in which the outer diameter of the projections A, B and C is caused to match the inner diameter of the outer pipe 7, the outer diameter thereof is caused to match the inner diameter of the outer pipe 7 at portions A and C, but the portion B therebetween may not be caused to match the inner diameter of the outer pipe 7.

Further, the number and shape of projections and disposed position thereof are not limited to the construction of the above preferred embodiments. They may be subjected to various modifications, too. For example, it is possible that a plurality of small and fine projections are adequately provided between the projections C and projections B.

Still further, the projections may be made integral with the inner pipe 6, and separate projections may be attached to the outer circumference of the inner pipe 6.

What is claimed is:

1. An electric soldering iron comprising:
   an inner pipe attached to a grip portion of a soldering iron;
   an outer pipe fitted to said inner pipe; means for introducing an inert gas to an annularly uniform space between said inner pipe and said outer pipe over the entire circumference of said pipes;
   a nozzle which jets said inert gas supplied through said base end portion of the soldering iron tip to the tip end side of said soldering iron tip through said annularly uniform space to inhibit oxidation of both the soldering iron tip and the workpiece brought into contact with the iron tip; and
   a plurality of projections between the outer circumference of said inner pipe and the inner circumference of said outer pipe in order to dispose said outer pipe and said inner pipe concentrically with each other.

2. An electronic soldering iron as set forth in claim 1, wherein said projections are formed so as to protrude outward in the radial direction on the outer circumference of said inner pipe, and are provided with projection (A) formed at the base end side of said inner pipe, projections (C) formed at the tip end side of said inner pipe, and projections (B) formed between said projections (A) and said projections (C);
   the outer diameters at portions where the projections are formed are sized so as to match the inner diameter of said outer pipe and to form said annularly uniform space over the entire circumference of the pipes;
   said projections (A) are formed roughly annular and continued on the circumference; an inert gas is supplied from the outer circumference of said outer pipe between said projections (A) and said projections (B); and
   said projections (C) are disposed so that the interval thereof is made wider on the circumference than that of said projections (B).

3. An electric soldering iron as set forth in claim 1, wherein a stainless steel wire net or metallic wool is disposed in said annularly uniform space as a damping member to decelerate the speed of the inert gas.

4. An electric soldering iron as set forth in claim 2, wherein a stainless steel wire net or metallic wool is disposed in said annularly uniform space as a damping member to decelerate the speed of the inert gas.

5. An electric soldering iron as set forth in claim 1, wherein an outlet at the tip end portion of said nozzle is tapered toward the tip end portion of the soldering iron in order to lower the concentration of oxygen mixing with the inert gas.

6. An electric soldering iron as set forth in claim 2, wherein an outlet at the tip end portion of said nozzle is tapered toward the tip end portion of the soldering iron in order to lower the concentration of oxygen mixing with the inert gas.

7. An electric soldering iron as set forth in claim 3, wherein an outlet at the tip end portion of said nozzle is tapered toward the tip end portion of the soldering iron in order to lower the concentration of oxygen mixing with the inert gas.

8. An electric soldering iron as set forth in claim 4, wherein an outlet at the tip end portion of said nozzle is tapered toward the tip end portion of the soldering iron in order to lower the concentration of oxygen mixing with the inert gas.

9. An electric soldering iron as set forth in claim 1, wherein the tip end portion of said soldering iron is partially covered by causing said outer pipe to extend beyond the tip end of said inner pipe and extend only to an extent that workability is not substantially restricted.

10. An electric soldering iron as set forth in claim 2, wherein the tip end portion of said soldering iron is partially covered by causing said outer pipe to extend beyond the tip end of said inner pipe and extend only to an extent that workability is not substantially restricted.

11. An electric soldering iron as set forth in claim 3, wherein the tip end portion of said soldering iron is partially covered by causing said outer pipe to extend beyond the tip end of said inner pipe and extend only to an extent that workability is not substantially restricted.

12. An electric soldering iron as set forth in claim 4, wherein the tip end portion of said soldering iron is partially covered by causing said outer pipe to extend beyond the tip end of said inner pipe and extend only to an extent that workability is not substantially restricted.

13. An electric soldering iron as set forth in claim 5, wherein the tip end portion of said soldering iron is partially covered by causing said outer pipe to extend beyond the tip end of said inner pipe and extend only to an extent that workability is not substantially restricted.

14. An electric soldering iron as set forth in claim 6, wherein the tip end portion of said soldering iron is partially covered by causing said outer pipe to extend beyond the tip end of said inner pipe and extend only to an extent that workability is not substantially restricted.

15. An electric soldering iron as set forth in claim 7, wherein the tip end portion of said soldering iron is partially covered by causing said outer pipe to extend beyond the tip end of said inner pipe and extend only to an extent that workability is not substantially restricted.

16. An electric soldering iron as set forth in claim 8, wherein the tip end portion of said soldering iron is partially covered by causing said outer pipe to extend beyond the tip end of said inner pipe and extend only to an extent that workability is not substantially restricted.

17. An electronic soldering iron as set forth in claim 1, wherein said projections are formed so as to protrude inward in the radial direction on the inner circumference of said outer pipe, and are provided with projection (A) formed at the base end side of said inner pipe, projections (C) formed at the tip end side of said inner pipe, and projections (B) formed between said projections (A) and said projections (C);

the outer diameters at portions where the projections are formed are sized so as to match the inner diameter of said outer pipe and to form said annularly uniform space over the entire circumference of the inner pipe;

said projections (A) are formed roughly annular and continued on the circumference; an inert gas is supplied from the outer circumference of said outer pipe between said projections (A) and said projections (B); and said projections (C) are disposed so that the interval thereof is made wider on the circumference than that of said projections (B).

* * * * *